(12) United States Patent
Mallick et al.

(10) Patent No.: US 8,589,865 B2
(45) Date of Patent: Nov. 19, 2013

(54) COMPOSITE APPLICATIONS USING SERVICE COMPONENT ARCHITECTURE MODEL AND OPEN VIRTUALIZATION FORMAT

(75) Inventors: Sudeep Mallick, Bangalore (IN); Rajarshi Bhose, Bangalore (IN); Ganesan Malaiyandisamy, Bangalore (IN)

(73) Assignee: Infosys Limited, Bangalore (IN)

( * ) Notice: Subject to any disclaimer, the term of this patent is extended or adjusted under 35 U.S.C. 154(b) by 412 days.

(21) Appl. No.: 13/112,737

(22) Filed: May 20, 2011

(65) Prior Publication Data

US 2012/0260228 A1    Oct. 11, 2012

(30) Foreign Application Priority Data

Apr. 7, 2011    (IN) .......................... 1199/CHE/2011

(51) Int. Cl.
*G06F 9/44*    (2006.01)

(52) U.S. Cl.
USPC ........................... 717/104; 717/103; 717/107

(58) Field of Classification Search
USPC .................................. 717/103, 104, 106, 107
See application file for complete search history.

(56) References Cited

U.S. PATENT DOCUMENTS

| | | | | |
|---|---|---|---|---|
| 8,281,307 B2* | 10/2012 | Arnold et al. | ...................... | 718/1 |
| 8,332,459 B2* | 12/2012 | Blum et al. | .................... | 709/201 |
| 2007/0169103 A1* | 7/2007 | Bhatkhande et al. | ......... | 717/170 |
| 2009/0217287 A1* | 8/2009 | Blum et al. | .................... | 718/105 |
| 2010/0250228 A1* | 9/2010 | Cohn et al. | ....................... | 703/22 |
| 2010/0306772 A1* | 12/2010 | Arnold et al. | ..................... | 718/1 |

OTHER PUBLICATIONS

Ralph Mietzner, "A method and implementation to define and provision variable composite applications, and its usage in cloud", 2010.*
Leymann et al., "Moving applications to the cloud: An approach based on application model enrichment", 2011.*
Evelyn Pfeuffer, "Service Design Methodology", 2007.*
DMTF, "Open Virtualization Format Specification," <http://www.dmtf.org/sites/default/files/standards/documents/DSP0243_1.1.0.pdf>, Version 1.1.0, 42 pages (Jan. 20, 2010).
Bernard Golden, "OVF: A Standard for Virtualization's Future," <http://www.cio.com/article/print/474894>, 3 pages (Jan. 8, 2009).
David Chappell, "Introducing SCA," <http://www.davidchappell.com/articles/introducing_sca.pdf>, 22 pages (Jul. 2007).
Bhose et al., "Integrating Composite Applications on the Cloud Using SCA," <http://www.ddj.com/web-development/223800269>, 9 pages (Mar. 15, 2010).
Wikipedia, "Service component architecture," <http://en.wikipedia.org/wiki/Service_component_architecture>, 5 pages (accessed Mar. 15, 2011).

(Continued)

*Primary Examiner* — Phillip H Nguyen
(74) *Attorney, Agent, or Firm* — Klarquist Sparkman, LLP

(57) ABSTRACT

Composite applications can be created that utilize a plurality of different services across a plurality of different cloud stack layers. The composite applications are defined using the Service Component Architecture (SCA) model. Composite applications can be translated from the SCA model into a format compatible for a virtualization platform, such as the Open Virtualization Format (OVF). Composite applications, as defined in the format compatible for the virtualization platform, can be deployed on the virtualization platform.

20 Claims, 4 Drawing Sheets

(56) References Cited

OTHER PUBLICATIONS

"Apache Tuscany," tuscany.apache.org, visited Sep. 24, 2010, 1 page.
"Eucaluptus," open.eucaluptus.com, Eucalyptus Systems, Inc., visited Sep. 24, 2010, 2 pages.
"Learn about cloud computing," open.eucaluptus.com, Eucalyptus Systems, Inc., visited Sep. 24, 2010, 2 pages.
"HowTo," www.openvpn.net, OpenVPN Technologies, Inc., visited Sep. 24, 2010, 23 pages.
"What is OpenVPN?" www.openvpn.net, OpenVPN Technologies, Inc., visited Sep. 24, 2010, 2 pages.

* cited by examiner

COMPOSITE APPLICATIONS USING SERVICE COMPONENT ARCHITECTURE MODEL AND OPEN VIRTUALIZATION FORMAT

BACKGROUND

Existing cloud computing technology vendors provide various cloud computing services, such as infrastructure services, platform services, and application services. Using these cloud computing services, a developer is able to select a specific vendor, develop an application from that vendor's cloud computing service, and deploy the application with that vendor.

While developing a solution using a cloud service provided by a specific vendor can be relatively straightforward, developing a solution using different types of cloud services, which may be provided by different vendors, can be difficult. In addition to creating such solutions that use different types of cloud services, deploying such solutions can also be difficult. For example, a developer may have to manually specify the requirements of a virtualization platform on which the solution is to be deployed. Furthermore, the specification or requirements of the virtualization platform may be in a format specific to a particular cloud vendor, which can limit the available choices for deployment of the solution.

Therefore, there exists ample opportunity for improvement in technologies related to creating composite applications that use different types of cloud computing services.

SUMMARY

A variety of technologies related creating composite applications using Service Component Architecture (SCA) model are applied.

For example, a method is provided for creating composite applications. The method comprises creating a composite application that utilizes a plurality of different services across a plurality of different cloud stack layers, where the composite application is defined using the SCA model. The method can further comprise translating the composite application from the SCA model into a format compatible for a virtualization platform. The method can further comprise deploying the composite application, as defined in the format compatible for the virtualization platform, on the virtualization platform. In a specific implementation, the format compatible for the virtualization platform is the Open Virtualization Format (OVF).

As another example, a computer system is provided for creating composite applications. The computer system can comprise a processing unit, memory, and computer-readable medium storing computer executable instructions which, when executed by the computer system, causes the computer system to perform operations comprising creating a composite application that utilizes a plurality of different services across a plurality of different cloud stack layers, where the composite application is defined using a Service Component Architecture (SCA) model. The operations can further comprise translating the composite application from the SCA model into a format compatible for a virtualization platform, and deploying the composite application, as defined in the format compatible for the virtualization platform, on the virtualization platform.

As another example, a computer-readable medium storing computer executable instructions is provided for causing a computing device to perform a method for creating composite applications, the method comprising creating a composite application that utilizes a plurality of different services across a plurality of different cloud stack layers, where the composite application is defined using a Service Component Architecture (SCA) model. The method can further comprise translating the composite application from the SCA model into the Open Virtualization Format (OVF), and deploying the composite application, as defined in the OVF, on a virtual machine supporting the OVF.

The foregoing and other features and advantages of the invention will become more apparent from the following detailed description, which proceeds with reference to the accompanying figures.

DETAILED DESCRIPTION OF EXEMPLARY EMBODIMENTS

Figure 1:
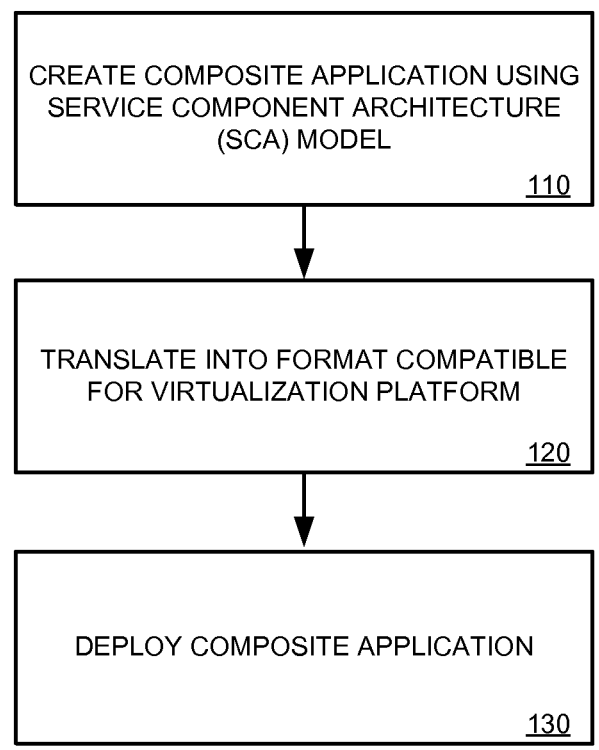
FIG. 1 is a flowchart showing an example method for creating composite applications using Service Component Architecture (SCA) model.

The following description is directed to techniques and solutions for creating composite applications utilizing the Service Component Architecture (SCA) model. The various techniques and solutions can be used in combination or independently. Different embodiments can implement one or more of the described techniques and solutions.

I. Creating Composite Applications

In the techniques and solutions described herein, composite applications refer to applications that utilize a plurality of different services (e.g., homogeneous and/or heterogeneous services) across a plurality of different cloud stack layers. For example, a composite application can use services from different cloud stack layers of a single cloud provider, or the composite application can use one service from one cloud provider and another service from a different cloud provider.

In the techniques and solutions described herein, composite applications are defined using the Service Component Architecture (SCA) model. The SCA model provides a specialized Service Oriented Architecture (SOA) approach with the ability to develop and define composite applications that utilize services from various cloud providers and/or various cloud stack layers. Currently, version 1.0 of the SCA specification documents are provided by the OASIS® Open CSA standards organization.

Composite applications can use existing services from different provides and/or different cloud stack layers to create new services. The new services created using composite applications can provide new features and functionality not available from the utilized existing services. Composite applications can provide more than merely a combination of existing services. For example, composite applications can use information from existing services, and add new processing or functionality, in order to create new services.

Using the SCA model to define composite applications provides advantages during provisioning and deployment of the composite applications. For example, using the SCA model provides for leveraging cloud computing environment services at a higher level of abstraction.

II. Translating and Deploying Composite Applications

In the techniques and solutions described herein, composite applications, defined using the SCA model, can be translated into a format compatible for a virtualization platform. Translating the composite applications allows the composite applications to be deployed using a virtual machine that supports the format (e.g., any virtual machine that supports the format).

In a specific implementation, composite applications, defined using the SCA model, are translated into the Open Virtualization Format (OVF). The current version of the OVF specification is the Open Virtualization Format Specification version 1.1.0 (dated Jan. 12, 2010), available from the Distributed Management Task Force, Inc. (DMTF).

In a specific implementation, the SCA model is translated into the OVF by a SCA runtime environment. For example, the SCA runtime environment can be an extended SCA runtime environment in which an existing SCA runtime environment is extended with the capability of performing the translation.

In a specific implementation, an SCA runtime environment performs the following operations in order to translate a composite application defined using the SCA model into the OVF.
1. The SCA runtime reads the SCA model defining the composite application.
2. The SCA runtime confirms that that the SCA model conforms to the SCA standard.
3. If the SCA model conforms, the SCA runtime performs the translation.
4. The SCA runtime then creates the OVF definition of the composite application from the SCA model.
5. Finally, the SCA runtime deploys the composite application, using the OVF definition, on a virtual machine that supports OVF.

III. Methods for Creating Composite Applications

In the techniques and solutions described herein, methods are provided for creating composite applications using the SCA model and the OVF.

FIG. 1 depicts an example method 100 for creating composite applications. At 110, a composite application, defined in the SCA model, is created. The composite application utilizes a plurality of different services across a plurality of different cloud stack layers.

At 120, the composite application, as defined in the SCA model, is translated into a format compatible for a virtualization platform. In a specific implementation, the composite application is translated into the OVF.

At 130, the composite application in the format compatible for the virtualization platform is deployed on the virtualization platform. For example, the composite application can be deployed on a virtual machine that supports the format. In a specific implementation, the composite application is in the OVF and is deployed on a virtual machine supporting the OVF.

IV. Cloud Providers and Cloud Stack Layers

In the techniques and solutions described herein, composite applications utilize services from different cloud stack layers and/or different cloud providers.

Figure 2:
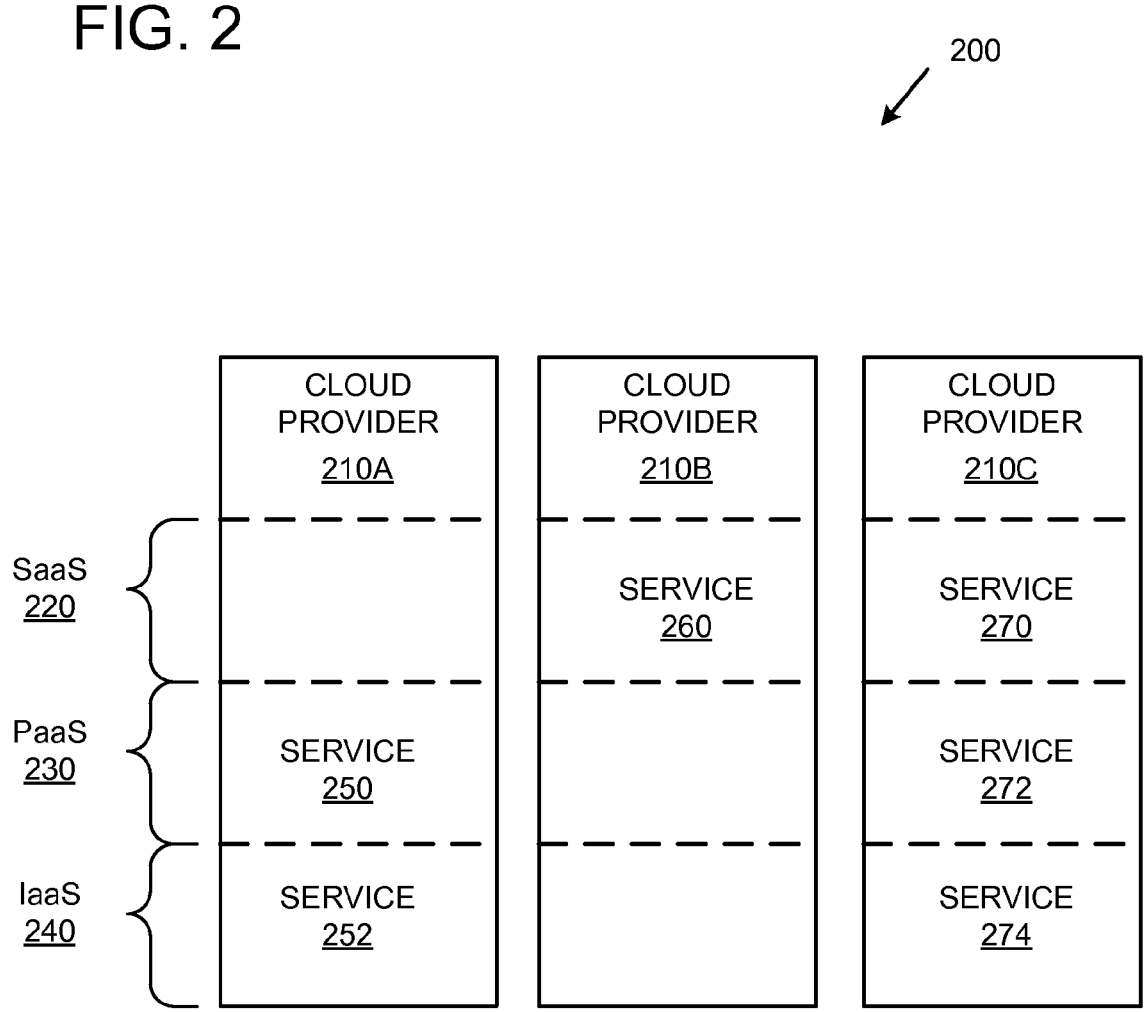
FIG. 2 is a diagram depicting an example plurality of cloud providers and cloud stack layers.

FIG. 2 is a diagram 200 depicting an example plurality of cloud providers and cloud stack layers. In the diagram 200, three cloud stack layers are depicted, an infrastructure as a service (IaaS) cloud stack layer 240, a platform as a service (PaaS) cloud stack layer 230, and a software as a service (SaaS) cloud stack layer 220.

The IaaS cloud stack layer 240 provides infrastructure related services, such as virtualized computer hardware resources. Some examples of infrastructure related services are storage and network services.

The PaaS cloud stack layer 230 provides platform related services, such as programming or runtime environments. For example, using a PaaS cloud stack layer 230 service, a developer could develop a custom application.

The SaaS cloud stack layer 220 provides application programs. For example, a SaaS cloud stack layer 220 could provide a software application service to users, such as an online word processing service or a web-based email service.

In the diagram, 200, three different cloud providers are depicted, Cloud Provider 210A, Cloud Provider 210B, and Cloud Provider 210C. The Cloud Providers 210A-C provide services at one or more cloud stack layers (220, 230, and/or 240). For example, Cloud Provider 210A provides a service 250 at the PaaS cloud stack layer 230 and a service 252 and the IaaS cloud stack layer 240. Cloud Provider 210B provides a service 260 at the SaaS cloud stack layer 220. Cloud Provider 210C provides a service 270 at the SaaS cloud stack layer 220, a service 272 at the PaaS cloud stack layer 230, and a service 274 at the IaaS cloud stack layer 240.

A composite application can be created that utilizes services at different cloud stack layers and/or from different cloud providers. For example, a composite application could utilize service 250 at the PaaS layer 230 and service 252 from the IaaS layer 240, both from Cloud Provider 210A. As another example, a composite application could utilize service 252 at the IaaS layer 240 from Cloud Provider 210A and service 274 at the IaaS layer 240 from Cloud Provider 210C. As yet another example, a composite application could utilize service 260 at the SaaS layer 220 from Cloud Provider 210B and service 272 at the PaaS layer 230 from Cloud Provider 210C.

In order to illustrate an example composite application utilizing various services with reference to the example diagram 200, consider a payment service composite application. The payment service could utilize a payment gateway service, which could refer to service 260 at the SaaS layer 220 provided by Cloud Provider 210B. The payment service could also utilize a storage service running at the IaaS layer (e.g., to store a database of transaction information), which could refer to service 252 at the IaaS layer 240 provided by Cloud Provider 210A. The payment service could also utilize a service integration service running at the PaaS cloud stack layer, which could refer to service 272 at the PaaS layer 230 provided by Cloud Provider 210C.

V. Creation Environment

In the techniques and solutions described herein, composite applications can be created that utilize services from different cloud stack layers and/or different cloud providers.

Figure 3:
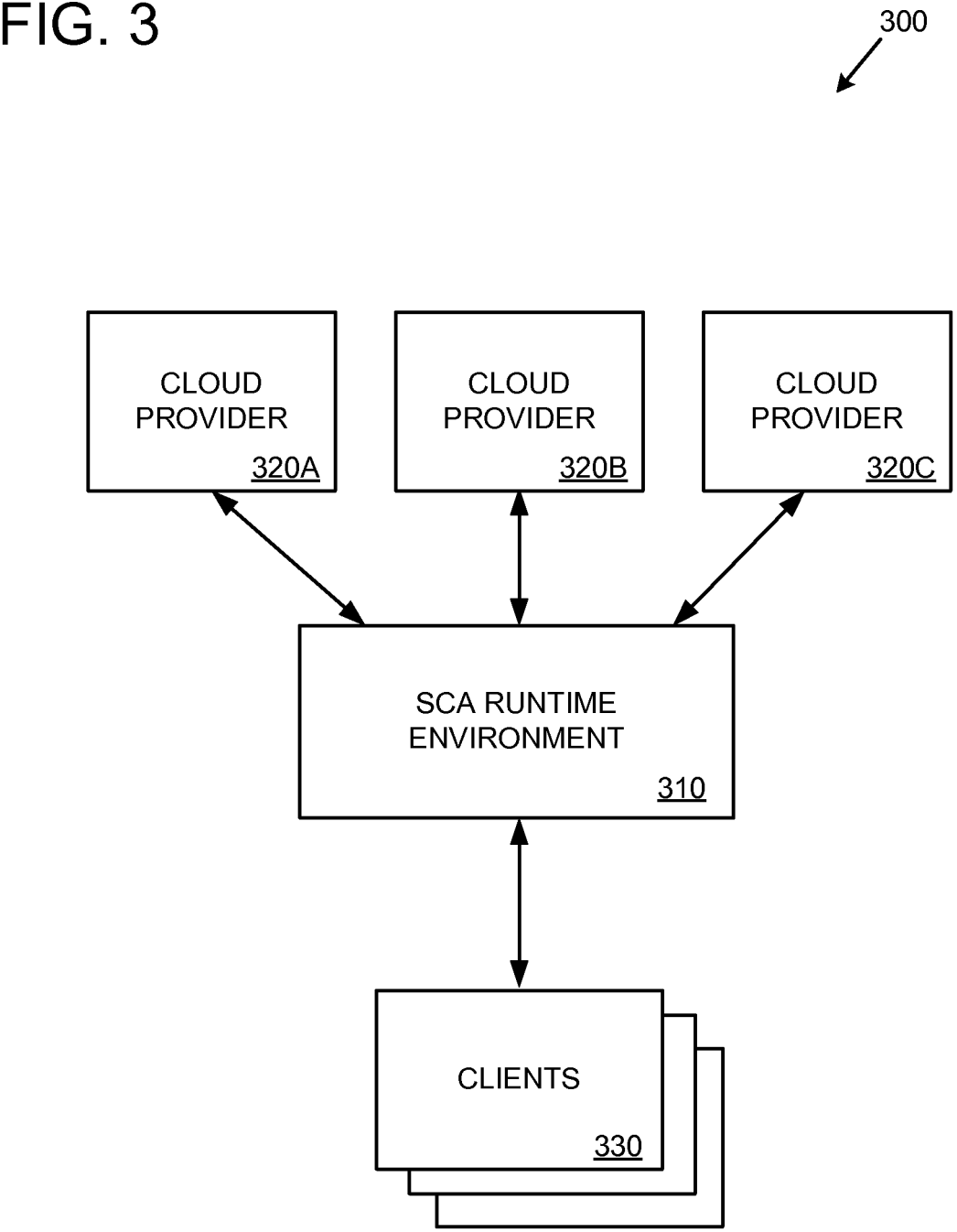
FIG. 3 is a diagram depicting an example environment for creating composite applications using SCA model.

FIG. 3 is a diagram depicting an example environment 300 for creating composite applications using the SCA model. In the example environment 300, a SCA runtime environment is provided 310. The SCA runtime environment 310 provides an environment in which composite applications can be created, translated, and/or deployed. For example, the SCA runtime environment 310 can be a traditional SCA runtime that has been extended to perform creation, translation, and/or deployment functions for composite applications defined using the SCA model.

Using the SCA runtime environment 310, composite applications can be created and defined using the SCA model. The composite applications utilize services from a plurality of cloud providers (e.g., cloud providers 320A-C) and/or from services from a plurality of different cloud stack layers provided by one or more cloud providers (e.g., one or more of cloud providers 320A-C). For example, services provided by the cloud providers 310 can be accessed via a connecting network, such as the Internet.

Using the SCA runtime environment 310, composite applications can be translated from the SCA model to a format compatible for a virtualization platform. For example, the composite applications can be translated from the SCA model to the OVF.

Using the SCA runtime environment 310, composite applications can be deployed (e.g., executed or run). The composite applications can be deployed on a virtual machine that supports the format, such as a virtual machine that supports the OVF.

Using the SCA runtime environment 310, deployed composite applications can provide services to clients, such as clients 330. The SCA runtime environment 310 can provide services to clients over a connecting network, such as the Internet.

VI. Computing Devices

The techniques and solutions described herein can be performed by software and/or hardware of a computing environment, such as a computing device. For example, computing devices include server computers, desktop computers, laptop computers, notebook computers, netbooks, tablet devices, mobile devices, and other types of computing devices (e.g., devices such as televisions, media players, or other types of entertainment devices that comprise computing capabilities such as audio/video streaming capabilities and/or network access capabilities). The techniques and solutions described herein can be performed in a cloud computing environment (e.g., comprising virtual machines and underlying infrastructure resources).

Figure 4:
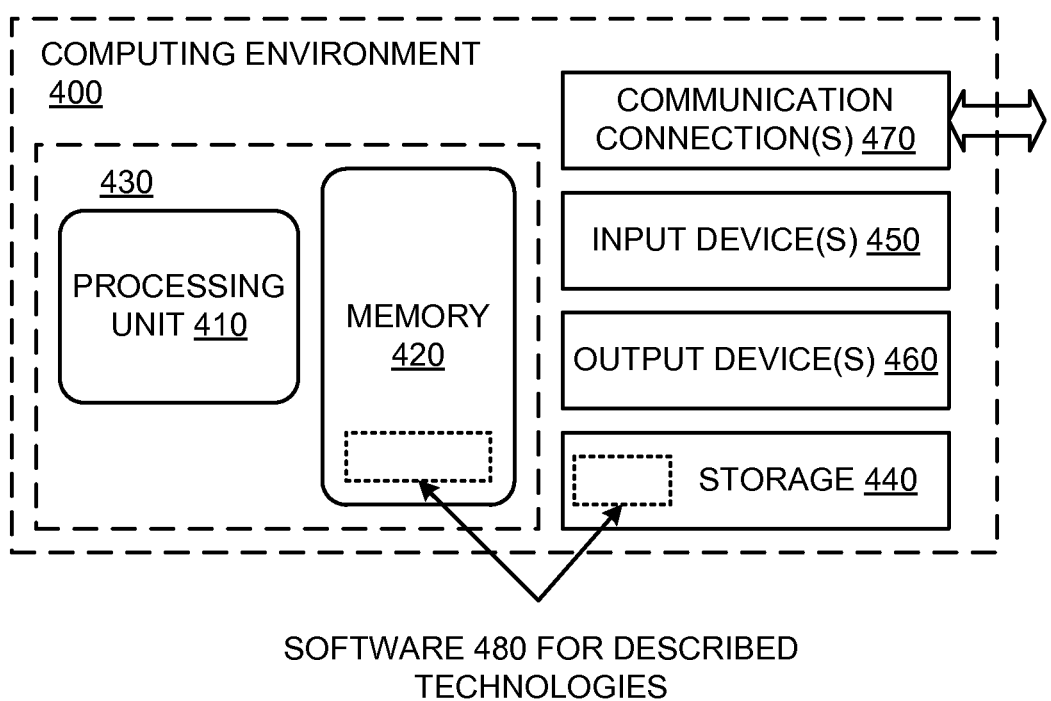
FIG. 4 is a block diagram showing an example computing device.

FIG. 4 illustrates a generalized example of a suitable computing environment 400 in which described embodiments, techniques, and technologies may be implemented. The computing environment 400 is not intended to suggest any limitation as to scope of use or functionality of the technology, as the technology may be implemented in diverse general-purpose or special-purpose computing environments. For example, the disclosed technology may be implemented using a computing device (e.g., a server, desktop, laptop, hand-held device, mobile device, PDA, etc.) comprising a processing unit, memory, and storage storing computer-executable instructions implementing the service level management technologies described herein. The disclosed technology may also be implemented with other computer system configurations, including hand held devices, multiprocessor systems, microprocessor-based or programmable consumer electronics, network PCs, minicomputers, mainframe computers, a collection of client/server systems, and the like. The disclosed technology may also be practiced in distributed computing environments where tasks are performed by remote processing devices that are linked through a communications network. In a distributed computing environment, program modules may be located in both local and remote memory storage devices.

With reference to FIG. 4, the computing environment 400 includes at least one central processing unit 410 and memory 420. In FIG. 4, this most basic configuration 430 is included within a dashed line. The central processing unit 410 executes computer-executable instructions. In a multi-processing system, multiple processing units execute computer-executable instructions to increase processing power and as such, multiple processors can be running simultaneously. The memory 420 may be volatile memory (e.g., registers, cache, RAM), non-volatile memory (e.g., ROM, EEPROM, flash memory, etc.), or some combination of the two. The memory 420 stores software 480 that can, for example, implement the technologies described herein. A computing environment may have additional features. For example, the computing environment 400 includes storage 440, one or more input devices 450, one or more output devices 460, and one or more communication connections 470. An interconnection mechanism (not shown) such as a bus, a controller, or a network, interconnects the components of the computing environment 400. Typically, operating system software (not shown) provides an operating environment for other software executing in the computing environment 400, and coordinates activities of the components of the computing environment 400.

The storage 440 may be removable or non-removable, and includes magnetic disks, magnetic tapes or cassettes, CD-ROMs, CD-RWs, DVDs, or any other tangible storage medium which can be used to store information and which can be accessed within the computing environment 400. The storage 440 stores instructions for the software 480, which can implement technologies described herein.

The input device(s) 450 may be a touch input device, such as a keyboard, keypad, mouse, pen, or trackball, a voice input device, a scanning device, or another device, that provides input to the computing environment 400. For audio, the input device(s) 450 may be a sound card or similar device that accepts audio input in analog or digital form, or a CD-ROM reader that provides audio samples to the computing environment 400. The output device(s) 460 may be a display, printer, speaker, CD-writer, or another device that provides output from the computing environment 400.

The communication connection(s) 470 enable communication over a communication medium (e.g., a connecting network) to another computing entity. The communication medium conveys information such as computer-executable instructions, compressed graphics information, or other data in a modulated data signal.

VII. Example Alternatives and Variations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable media (tangible computer-readable storage media, such as one or more optical media discs, volatile memory components (such as DRAM or SRAM), or nonvolatile memory components (such as hard drives)) and executed on a computing device (e.g., any commercially available computer, including smart phones or other mobile devices that include computing hardware). By way of example, computer-readable media include memory 420 and/or storage 440. As should be readily understood, the term computer-readable media does not include communication connections (e.g., 470) such as modulated data signals.

Any of the computer-executable instructions for implementing the disclosed techniques as well as any data created and used during implementation of the disclosed embodiments can be stored on one or more computer-readable media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computing device to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. We therefore claim as our invention all that comes within the scope and spirit of these claims.

We claim:

1. A method, implemented at least in part by a computing device, for creating composite applications, the method comprising:

creating, using the computing device, a composite application that utilizes a plurality of different services across a plurality of different cloud stack layers, the composite application defined using a Service Component Architecture (SCA) model;

translating, by the computing device, the composite application from the SCA model into a format compatible for a virtualization platform; and deploying, by the computing device, the composite application, as defined in the format compatible for the virtualization platform, on the virtualization platform.

2. The method of claim 1 wherein the format compatible for a virtualization platform is the Open Virtualization Format (OVF).

3. The method of claim 2 wherein the OVF composite application is deployed on a cloud enabled virtualized environment that supports the OVF format.

4. The method of claim 1 wherein the plurality of different cloud stack layers comprise:

an infrastructure as a service (IaaS) cloud stack layer;
   a platform as a service (PaaS) cloud stack layer; and
   an software as a service (SaaS) cloud stack layer.

5. The method of claim 1 wherein the composite application utilizes:

a first service, of the plurality of different services, at a first cloud stack layer, of the plurality of different cloud stack layers; and a second service, of the plurality of different services, at a second cloud stack layer, of the plurality of different cloud stack layers, wherein the first service is different from the second service, and wherein the first cloud stack layer is different from the second cloud stack layer.

6. The method of claim 1 wherein the plurality of different services are a plurality of different cloud services, and wherein plurality of different services are provided by a plurality of different cloud providers.

7. The method of claim 1 wherein the creating the composite application and the translating the defined composite application are performed, at least in part, by a SCA runtime environment.

8. The method of claim 1 wherein the creating, translating, and deploying are performed by an extended SCA runtime environment.

9. A computer system for creating composite applications, the computer system comprising:

a processing unit;
   a memory; and
   a computer-readable medium storing computer executable instructions which, when executed by the computer system, causes the computer system to perform operations comprising:

creating a composite application that utilizes a plurality of different services across a plurality of different cloud stack layers, the composite application defined using a Service Component Architecture (SCA) model;

translating the composite application from the SCA model into a format compatible for a virtualization platform; and deploying the composite application, as defined in the format compatible for the virtualization platform, on the virtualization platform.

10. The computer system of claim 9 wherein the wherein the format compatible for a virtualization platform is the Open Virtualization Format (OVF).

11. The computer system of claim 10 wherein the OVF composite application is deployed on a cloud enabled virtualized environment that supports the OVF format.

12. The computer system of claim 9 wherein the plurality of different cloud stack layers comprise:

an infrastructure as a service (IaaS) cloud stack layer;
   a platform as a service (PaaS) cloud stack layer; and
   an software as a service (SaaS) cloud stack layer.

13. The computer system of claim 9 wherein the composite application utilizes:
- a first service, of the plurality of different services, at a first cloud stack layer, of the plurality of different cloud stack layers; and
- a second service, of the plurality of different services, at a second cloud stack layer, of the plurality of different cloud stack layers, wherein the first service is different from the second service, and wherein the first cloud stack layer is different from the second cloud stack layer.

14. The computer system of claim 9 wherein the plurality of different services are a plurality of different cloud services, and wherein plurality of different services are provided by a plurality of different cloud providers.

15. The computer system of claim 9 wherein the computer system implements, at least in part, an extended SCA runtime environment.

16. A computer-readable medium storing computer executable instructions for causing a computing device to perform a method for creating composite applications, the method comprising:
- creating a composite application that utilizes a plurality of different services across a plurality of different cloud stack layers, the composite application defined using a Service Component Architecture (SCA) model;
- translating the composite application from the SCA model into the Open Virtualization Format (OVF); and
- deploying the composite application, as defined in the OVF, on a virtual machine supporting the OVF.

17. The computer-readable medium of claim 16 wherein the plurality of different cloud stack layers comprise:
- an infrastructure as a service (IaaS) cloud stack layer;
- a platform as a service (PaaS) cloud stack layer; and
- an software as a service (SaaS) cloud stack layer.

18. The computer-readable medium of claim 16 wherein the composite application utilizes:
- a first service, of the plurality of different services, at a first cloud stack layer, of the plurality of different cloud stack layers; and
- a second service, of the plurality of different services, at a second cloud stack layer, of the plurality of different cloud stack layers, wherein the first service is different from the first service, and wherein the first cloud stack layer is different from the second cloud stack layer.

19. The computer-readable medium of claim 16 wherein the plurality of different services are provided by a plurality of different cloud providers.

20. The computer-readable medium of claim 16 wherein the creating, the translating, and the deploying are implemented within an extended SCA runtime environment.

* * * * *

UNITED STATES PATENT AND TRADEMARK OFFICE
CERTIFICATE OF CORRECTION

PATENT NO.        : 8,589,865 B2                                     Page 1 of 1
APPLICATION NO.   : 13/112737
DATED             : November 19, 2013
INVENTOR(S)       : Mallick et al.

It is certified that error appears in the above-identified patent and that said Letters Patent is hereby corrected as shown below:

In the Claims:

Column 8, line 14, "an software" should read -- a software --.

Column 8, line 67, "an software" should read -- a software --.

Column 10, line 8, "an software" should read -- a software --.

Column 8, line 28, "wherein plurality" should read -- wherein the plurality --.

Column 9, line 13, "wherein plurality" should read -- wherein the plurality --.

Column 8, line 57-58, "wherein the wherein the" should read -- wherein the --.

Column 10, line 17, "from the first service" should read -- from the second service --.

Signed and Sealed this
First Day of March, 2016

Michelle K. Lee
*Director of the United States Patent and Trademark Office*